United States Patent [19]

Roggero et al.

[11] Patent Number: 5,064,548

[45] Date of Patent: Nov. 12, 1991

[54] SOLID POLYMERIC ELECTROLYTE

[75] Inventors: Arnaldo Roggero, San Donato Milanese; Maria Andrei, Berceto; Stefano Passerini; Bruno Scrosati, both of Rome, all of Italy

[73] Assignee: 501 Eniricerche S.p.A., Italy

[21] Appl. No.: 561,716

[22] Filed: Aug. 1, 1990

[30] Foreign Application Priority Data

Aug. 1, 1989 [IT] Italy .................. 21406 A/89

[51] Int. Cl.$^5$ .................. H01G 4/18; H01M 6/18
[52] U.S. Cl. .................. 252/62.2; 429/192
[58] Field of Search .................. 429/192; 252/62.2

[56] References Cited

U.S. PATENT DOCUMENTS

| | | | |
|---|---|---|---|
| 4,200,701 | 4/1980 | Wetton | 252/62.2 |
| 4,471,037 | 9/1984 | Bannister | 429/192 |
| 4,578,326 | 3/1986 | Armand | 429/192 |
| 4,722,877 | 2/1988 | Sammells | 429/192 |
| 4,886,716 | 12/1989 | Roggero | 429/192 |

*Primary Examiner*—Prince E. Willis
*Assistant Examiner*—Thomas Steinberg
*Attorney, Agent, or Firm*—Hedman, Gibson, Costigan & Hoare

[57] ABSTRACT

A solid polymeric electrolyte is constituted by a solid solution of an ionic compound in an organic matrix of polyether nature, constituted by a mixture consisting of: a high-molecular-weight poly-(ethylene oxide); and the product of polymerization of a vinylether having the formula:

$$R-(O-CH_2-CH_2)_n-O-CH=CH_2$$

wherein:

R means the methyl or ethyl radical; and
n is an integer within the range of from 2 to 6, with said polyvinylether having a number average molecular weight within the range of from about 1,000 to about 10,000 and the weight ratio of said poly(ethylene oxide) to said polyvinylether being within the range of from 10:90 to 90:10.

5 Claims, 1 Drawing Sheet

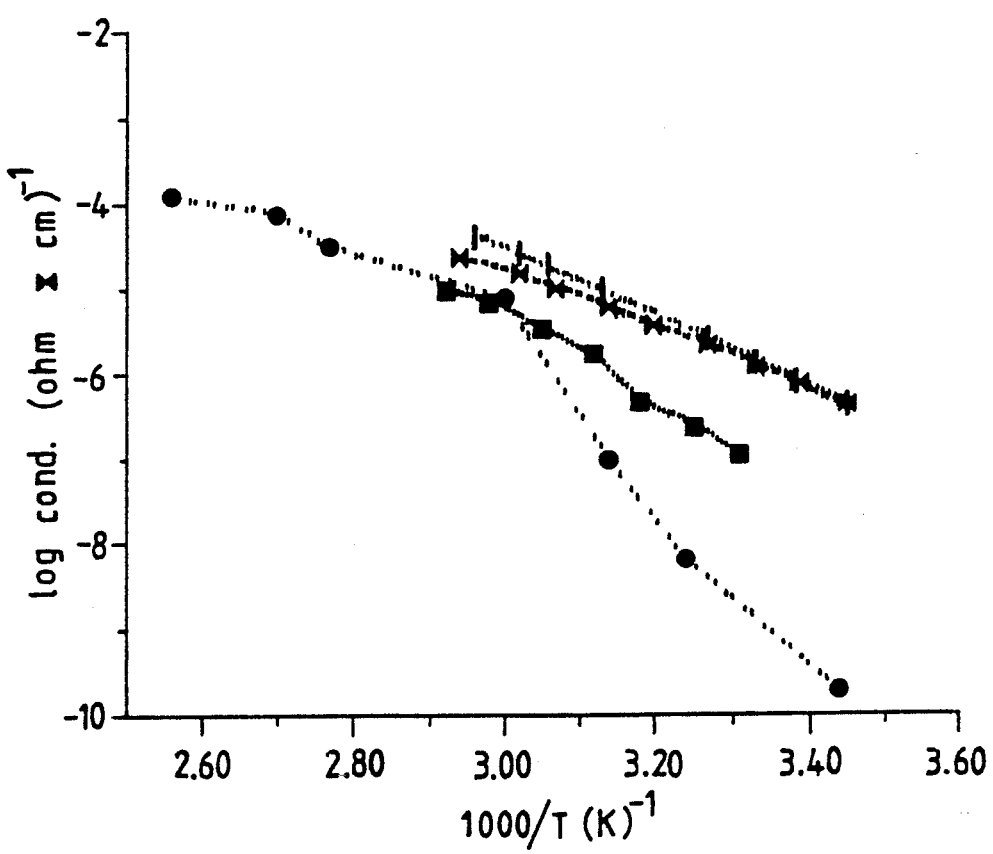

SOLID POLYMERIC ELECTROLYTE

The present invention relates to a solid polymeric electrolyte based on compounds of polyether nature, and to the devices which incorporate the same electrolyte.

In the art solid polymeric electrolytes are known, which are also said "ionic conductive polymers" and are constituted by a solid solution of an ionic compound totally dissolved in a solid, plastic macromolecular material. In particular, a solid polymeric electrolyte consisting of poly-(ethylene oxide) and a lithium salt, endowed with characteristics of ionic conductivity, is described in the paper introduced by M.D. Armand at the 2nd International Conference on Solid Electrolytes at St. Andrews University, U.K., in 1978. Other solid polymeric electrolytes which use a polyvinyl ether as their macromolecular material are disclosed in European Pat. No. 13,199. The main drawback shown by these solid polymeric electrolytes consists in that they only display a satisfactory ionic conductivity at temperatures higher than room temperature, and therefore are poorly interesting for a practical use in electrochemical generators.

Furthermore, solid polymeric electrolytes were proposed in the art, in which the macromolecular material is a mixture of poly-(ethylene oxide) with polyvinylmethyl-ether, or with a polyethyleneglycol-ether-alkoyl, as respectively reported in U.S. Pat. No. 4,471,037 and in French Pat. No. 2,568,574. In the first case, the use of the polymeric mixture improves the mechanical characteristics of the polymeric electrolyte, but the low-temperature conductivity is unsatisfactory, probably owing to the low solubility of the ionic compound in the same mixture. In the second case, the characteristics of low-temperature conductivity of the solid electrolyte are improved, but the mechanical characteristics thereof are unsatisfactory.

The purpose of the present invention is of overcoming the drawbacks of the prior art, which are briefly mentioned above. In particular, the present Applicant found according to the present invention that the adoption of a particular polymeric polyether mixture makes it possible for solid polymeric electrolytes to be provided, which are endowed with good mechanical characteristics, and are capable of dissolving large amounts of the ionic compound, such as to enable good conductivity values to be achieved at room temperature, or at temperatures close to room temperature.

In accordance therewith, the present invention relates to a solid polymeric electrolyte constituted by a solid solution of an ionic compound in an organic matrix of polyether nature, characterized in that said polyether matrix is constituted by a mixture consisting of:

a high-molecular-weight poly-(ethylene oxide); and
the product of polymerization of a vinylether having the formula:

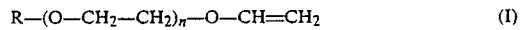
$$R-(O-CH_2-CH_2)_n-O-CH=CH_2 \qquad (I)$$

wherein:
R means the methyl or ethyl radical; and
n is an integer within the range of from 2 to 6,
with said polyvinylether having a number average molecular weight within the range of from about 1,000 to about 10,000 and a glass transition temperature (Tg) within the range of from −70° to −85° C., with the weight ratio of said poly-(ethylene oxide) component to said polyvinylether component being within the range of from 10:90 to 90:10.

In the preferred form of practical embodiment, the polyvinylether has a number average molecular weight within the range of from about 1,000 to about 5,000 and a glass transition temperature (Tg) within the range of from −73° to −82° C., and the weight ratio of the poly-(ethylene oxide) component to the polyvinylether component is within the range of from 10:90 to 50:50.

BRIEF DESCRIPTION OF THE DRAWING

The FIGURE shows the conductivity as a function of temperature of compositions of the present invention in comparison with compositions of the prior art in graphic form.

The poly-(ethylene oxide) useful for the purposes of the instant invention is the usual high-molecular-weight solid polymer, typically showing the following characteristics: an average molecular weight of about 5,000,000; a melting temperature of about 64° C.; a glass transition temperature of about −60° C., and a crystallinity of about 67%.

The vinyl ether (I) useful for preparing the polyvinylether, can be prepared by means of the reaction of ethyl-vinyl-ether:

$$CH_3-CH_2-O-CH=CH_2 \qquad (II)$$

with a polyoxyethyleneglycol-monoether, which can be represented by the formula:

$$RO-(-CH_2-CH_2-O)_nH \qquad (III)$$

wherein R and n have the same meaning as reported hereinabove in relation to formula (I).

The reaction is advantageously carried out in the liquid phase, with an excess of compound (II) relatively to compound (III), preferably at the reaction mixture reflux temperature, under room pressure and in the presence of a transesterification catalyst. Specific examples of catalysts suitable for the intended purpose are mercury-(II) salts, such as mercury-(II) acetate and mercury-(II) sulfate. The vinyl ether (I) is recovered from the reaction products by means of the usual separation techniques.

The polyvinylether can be obtained by polymerizing the vinylether (I) in solution in an inert solvent, at a temperature within the range of from about −80° C. to about +20° C., as a function of the desired molecular weight, and in the presence of a Friedel-Crafts catalyst. Examples of inert solvents suitable for the intended purpose are alifatic and aromatic hydrocarbons, such as heptane, benzene and toluene, as well as chlorinated alifatic hydrocarbons, such as dichloromethane. Examples of catalysts are etherated boron trifluoride, aluminum trichloride, aluminum-alkyl halides (such as diethyl-aluminum chloride and ethyl-aluminum dichloride) and tin tetrachloride. The catalyst is normally used in amounts of from 0.8 to 1 mol per each 100 mol of the vinylether (I) submitted to polymerization. Under the above indicated conditions, the polymerization times are of the order of from 30 to 60 minutes. At the end of the polymerization the catalyst is deactivated, e.g., by means of the addition of an aliphatic alcohol, such as methanol, and the polyvinylether is recovered from the polymerization vehicle, by means of the normal techniques of separation of a polymer from a solution thereof in an organic solvent.

The so obtained polyvinylether has a number average molecular weight (as determined by osmometric way) within the range of from about 1,000 to about 10,000, in particular as a function of the polymerization temperature. For the purposes of the present invention, polyvinylethers having a number average molecular weight within the range of from about 1,000 to about 5,000 are preferred. Such polyvinylethers display a glass transition temperature (Tg) which can be generally within the range of from $-70°$ to $-85°$ C. (as determined by DSC), with preferred values being within the range of from $-73°$ to $-82°$ C.

The solid polymeric electrolyte, according to the present invention, is constituted by a solid solution of an ionic compound in the mixture consisting of poly(ethylene oxide) and polyvinylether having the hereinabove disclosed characteristics. The ionic compounds useful for the intended purpose are the salts and in particular perchlorates, borates, fluoroborates, thiocyanates, trifluoroacetates and trifluoromethanesulfonates of monovalent or polyvalent metals, and, in particular, of lithium, sodium, potassium, calcium, copper, zinc, magnesium, lead, tin or aluminum used in such amounts as to have an atomic ratio of the oxygen contained in the polyether mixture to the metal, which is within the range of from about 4:1 to about 12:1. Lithium salts, e.g. lithium perchlorate or lithium fluoroborate are preferred for the intended purpose, and in this case the solid polymeric electrolyte can contain said ionic compound in an amount within the range of from 10 to 30% by weight, and preferably of the order of 20% by weight.

The preparation of the solid polymeric electrolyte can be carried out by dissolving in a suitable solvent, such as acetonitrile, the polyether mixture and, independently, the ionic compound.

In the polyether mixture, the weight ratio of the poly-(ethylene oxide) to the polyvinylether will be preferably maintained within the range of from 10:90 to 70:30. The two solutions are then mixed in order to obtain one single, homogeneous solution, which is deposited on a suitable support (e.g., a polytetrafluoroethylene disk) as a liquid film, from which the solvent is slowly evaporated off. At the end of the evaporation, suitably carried out under an argon atmosphere, a solid polymeric electrolyte is obtained in the form of a membrane, the thickness of which can be generally within the range of from 50 to 200 microns. This membrane is completely amorphous when the value of the ratio of poly-(ethylene oxide) component to polyvinylether component is within the above specified range.

Such a polymeric electrolyte is mechanically strong, dimensionally stable and highly conductive, even at relatively low temperature, with its conductivity being on ionic type in the absence, or in the substantial absence, of a conductivity of electronic type. The solid polymeric electrolyte can be used as the electrolytic separator in such devices as electrochemical generators, optical and electrochromic displays and in sensors.

Therefore, the instant invention also relates to such devices, which incorporate the above disclosed solid polymeric electrolyte.

The following experimental examples are reported for the purpose of better illustrating the present invention.

EXAMPLE 1

Preparation of Vinylether (I):

Ethylvinylether (1.8 mol), diethyleneglycolmonoethyl-ether (0.6 mol) and mercury-(II) acetate (0.0114 mol) are charged to a three-necked flask of 500 ml of capacity, equipped with reflux condenser and kept under nitrogen flow. The resulting mixture is heated up to the reflux temperature of ethylvinylether (70° C.) and is kept under such conditions for about 10 hours. The reaction is quenched by means of the addition of solid potassium carbonate and the resulting mixture is distilled, initially under atmospheric pressure in order to remove the excess of ethylvinylether and the ethyl alcohol obtained as the reaction byproduct, then under reduced pressure (20 torr) in order to separate the vinylether (I) of the title from the diethyleneglycolmonoethyl-ether used as the starting compound. The purity of the so obtained vinylether (I) is of more than 99% and its yield, as computed relatively to diethyleneglycolmonomethyl-ether used as the starting product, is of about 75%. The structure of the product is confirmed by N.M.R. spectroscopy, I.R. spectroscopy and mass spectrometry.

EXAMPLE 2

Preparation of Polyvinylether 9,600 mg (60 mmol) of vinylether (I) prepared in Example 1 and 15 ml of dichloromethane solvent are charged to a glass reactor of 100 ml of capacity, equipped with a glass-helix stirrer with a gas-tight seal and inlet ways for charging the reactants and feeding the inert gas.

The so obtained mixture is then heated up to a temperature within the range of from $-60°$ C. up to $+20°$ C., as a function of the desired molecular weight to be obtained, by using a refrigerating unit. The catalyst, i.e., etherated boron trifluoride (BF$_3$.Et$_2$O) (0.075 ml, equivalent to 0.6 mmol), diluted in the same polymerization solvent (total solution volume 3 ml) is slowly added to the so obtained mixture, with strong stirring. As the polymerization proceeds, an increase in system viscosity is observed, which is the larger, the lower the adopted operating temperature. The polymerization is discontinued after 30–60 minutes by means of the addition of a few drops of methanol in order to deactivate the catalyst, and the polymer is recovered by extraction with an organic solvent. The so obtained polyvinylether (7,600 g, equivalent to a yield of 80%) is a liquid with increasing viscosity values with increasing molecular weights.

The characterization of the polymer is carried out by N.M.R. and I.R. spectroscopy. The glass transition temperature of the polyvinylether, as determined by D.S.C., is within the range of from $-73°$ C. for the highest-molecular-weight polymers, to $-82°$ C. for the lowest-molecular-weight polymers. The number average molecular weight of the polyvinylether is determined by osmometry, with polyethyleneglycols of known molecular weight being used as the standard, and toluene being used as the reference solvent. The number average molecular weight values of the polyvinylethers (PVE) used in the following Examples are within the range of from about 1,000 to about 5,000.

EXAMPLE 3

Preparation of the Solid Polymeric Electrolyte

The polyvinylether (PVE) of Example 2 is dried by being kept at 60° C. under vacuum.

The polyethyleneoxide (PEO) used in order to prepare the mixtures is a product available from the market with an average molecular weight of about 5,000,000 which, before being used, is dried at 60° C. under vacuum. The lithium salts used, LiClO$_4$ and LiBF$_4$, are reagent-grade products, dried at 60° C. under vacuum. All of the above listed products are stored and handled inside a dry box with a moisture content lower than 10 ppm. Polymeric mixtures with various ratios of PVE/PEO by weight are prepared.

The solid polymeric electrolytes are prepared by dissolving prefixed amounts of the polymeric mixtures and of the lithium salt in high-purity acetonitrile, using about 30 ml of acetonitrile per each gram of polymeric mixture. After a 15-hours stirring at room temperature, homogeneous solutions are obtained, which are charged to teflon dishes. From these latter the solvent is slowly evaporated off, under an argon stream, over a 24-hours time. After solvent removal white polymeric membranes of from 100 to 150 microns of thickness are obtained, which have a plastic appearance and a good mechanical stability. The content of amorphous polymer in the polymeric conductive complexes is determined by D.S.C., with the glass transition temperature being simultaneously determined. The results of the above analyses demonstrate that the solid polymeric electrolytes in which the ratio of PEO to PVE is within the range of from 10:90 to 70:30 and in which the atomic ratio of oxygen to lithium is of 8:1, are completely amorphous, and have glass transition temperature (Tg) values within the range of from −20° C. to −40° C.

EXAMPLE 4

The ionic conductivity is determined of a solid polymeric electrolyte consisting of mixtures of poly(ethylene oxide) (PEO) and polyvinylether (PVE) having a number average molecular weight of 5,000 (prepared as disclosed above), with different mutual proportions of the two constituents and containing lithium perchlorate as the ionic compound, with an atomic ratio of oxygen, in said polyether mixture, to lithium in the ionic compound, of 8:1.

The conductivity is determined by means of measurements of impedance in cells consisting of two electrodes of stainless steel, between which the solid polymeric electrolyte is housed. The chart reported in the hereto attached Figure shows the values of conductivity, as a function of temperature, and, in particular:

- ▬■▬ is the line showing the behaviour of a solid polymeric electrolyte with a ratio of PEO to PVE of 10:90 by weight;
- ▬✕▬ is the line showing the behaviour of a solid polymeric electrolyte with a ratio of PEO to PVE of 37:63 by weight;
- ▬■▬ is the line showing the behaviour of a solid polymeric electrolyte with a ratio of PEO to PVE of 70:30 by weight; and
- ▬●▬ is the line showing, for comparative purposes, the behaviour obtained when only PEO is used as the solid polymeric electrolyte.

We claim:

1. A solid polymeric electrolyte comprising a solid solution of an ionic compound dissolved in an organic, polymeric matrix of polyether nature, wherein said polyether matrix comprises a mixture consisting of:
   a high-molecular-weight poly-(ethyleneoxide); and
   the product of polymerization of a vinyl ether having the formula:

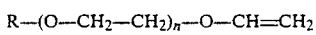

wherein:
   R is a methyl or ethyl radical; and
   n is an integer within the range of from 2 to 6,
   wherein said polyvinylether has a number average molecular weight within the range of from about 1,000 to about 10,000 and a glass transition temperature (Tg) within the range of from −70° to −85° C., and wherein the weight ratio of said poly-(ethylene oxide) component to said polyvinylether component is within the range of from 10:90 to 90:10.

2. A solid polymeric electrolyte according to claim 1, wherein the polyvinylether has a number average molecular weight within the range of from about 1,000 to about 5,000 and a glass transition temperature (Tg) within the range of from −73° to −82° C., and the weight ratio of the poly-(ethylene oxide) to the polyvinylether is within the range of from 10:90 to 70:30.

3. A solid polymeric electrolyte according to claim 1, wherein said ionic compound is selected from the group consisting of perchlorates, borates, fluoroborates, thiocyanates, trifluoroacetates and trifluoromethane sulfonates of lithium, sodium, potassium, calcium, copper, zinc, magnesium, lead, tin or aluminum, in such amounts as to have an atomic ratio of oxygen in the polyether mixture to the metal, which is within the range of from about 4:1 to about 12:1.

4. A solid polymeric electrolyte according to claim 3, wherein said ionic compound is lithium perchlorate or lithium fluoroborate.

5. A solid polymeric electrolyte according to claim 1 in the form of a membrane with a thickness within the range of from 50 to 200 microns.

* * * * *